(12) United States Patent
Plowman et al.

(10) Patent No.: US 7,500,392 B1
(45) Date of Patent: Mar. 10, 2009

(54) SOLID STATE MICROANEMOMETER DEVICE AND METHOD OF FABRICATION

(75) Inventors: Thomas E. Plowman, Raleigh, NC (US); Warren R. Jewett, Cary, NC (US)

(73) Assignee: Memsys, Inc., Cary, NC (US)

( * ) Notice: Subject to any disclaimer, the term of this patent is extended or adjusted under 35 U.S.C. 154(b) by 0 days.

(21) Appl. No.: 11/870,612

(22) Filed: Oct. 11, 2007

(51) Int. Cl.
G01F 1/68 (2006.01)
G01P 5/06 (2006.01)
(52) U.S. Cl. ............................ 73/204.26; 73/861.85
(58) Field of Classification Search ............ 73/204.26, 73/861.85
See application file for complete search history.

(56) References Cited

U.S. PATENT DOCUMENTS

| | | | |
|---|---|---|---|
| 4,594,889 A | 6/1986 | McCarthy | |
| 4,677,850 A | 7/1987 | Miura et al. | |
| 4,779,458 A | 10/1988 | Mawardi | |
| 4,885,937 A | 12/1989 | Tanaka et al. | |
| 4,930,347 A | 6/1990 | Henderson | |
| 4,966,037 A * | 10/1990 | Sumner et al. | 73/204.26 |
| 5,060,035 A | 10/1991 | Nishimura et al. | |
| 5,201,221 A | 4/1993 | Forgacs et al. | |
| 5,205,170 A | 4/1993 | Blechinger et al. | |
| 5,231,877 A | 8/1993 | Henderson | |
| 5,263,380 A | 11/1993 | Sultan et al. | |
| 5,310,449 A | 5/1994 | Henderson | |
| 5,313,832 A | 5/1994 | Stephan et al. | |
| 5,321,382 A | 6/1994 | Mizukoshi et al. | |
| 5,452,610 A | 9/1995 | Kleinhans et al. | |
| 5,883,310 A * | 3/1999 | Ho et al. | 73/766 |
| 6,032,527 A | 3/2000 | Genova et al. | |
| 6,139,758 A | 10/2000 | Tu | |
| 6,450,025 B1 | 9/2002 | Wado et al. | |
| 6,490,915 B2 | 12/2002 | Yamada et al. | |
| 6,502,459 B1 | 1/2003 | Bonne et al. | |
| 6,550,324 B1 | 4/2003 | Mayer et al. | |
| 6,631,638 B2 | 10/2003 | James et al. | |
| 6,725,716 B1 | 4/2004 | Kawai et al. | |
| 6,763,710 B2 | 7/2004 | Mayer et al. | |
| 6,779,712 B2 | 8/2004 | Kleinlogel et al. | |
| 6,794,981 B2 | 9/2004 | Padmanabhan et al. | |
| 6,860,149 B2 | 3/2005 | Igarashi et al. | |
| 6,920,786 B2 | 7/2005 | Mayer et al. | |
| 6,971,266 B2 | 12/2005 | Kawai | |
| 6,981,410 B2 | 1/2006 | Seki et al. | |

(Continued)

Primary Examiner—Harshad Patel
(74) Attorney, Agent, or Firm—Frommer, Lawrence & Haug LLP; Ronald R. Santucci

(57) ABSTRACT

The invention is a solid state microanemometer and a method of making thereof. Specifically, the invention relates to a microanemometer including an electrically conductive resistor in the form of a semiconductor wafer doped with an impurity having an upper surface, a lower surface having a peripheral edge; a substrate bonded to the semiconductor wafer having an upper surface, a cavity having a peripheral edge and a peripheral margin defined on the upper surface and bounded by the peripheral edge of the cavity wherein the lower surface of the semiconductor wafer rests on and is supported by at least part of the peripheral edge of the cavity such that the semiconductor wafer is over the cavity; and a means for electrically connecting the resistor to a current source. The microanemometer also includes a plurality of metal conductors in contact with the resistor. The semiconductor wafer has sloped sidewalls and the metal conductors are placed on sloped sidewalls of the wafer to effectively increase available active area of the resistor.

21 Claims, 8 Drawing Sheets

U.S. PATENT DOCUMENTS 7,036,369 B2 5/2006 Keppner et al.
7,109,842 B1 9/2006 Padmanabhan et al.
2006/0286707 A1 12/2006 Hooper et al.

* cited by examiner

SOLID STATE MICROANEMOMETER DEVICE AND METHOD OF FABRICATION

FIELD OF THE INVENTION

This invention is a micromachined solid state microanemometer having an improved substrate support with side contacting metal conductors, through-wafer electrical interconnects, and a passivation layer. This invention also includes a preferred embodiment providing for front side electrical contacts. The microanemometer described herein is sensitive to low fluid flow rates and is rugged enough to operate in harsh environments of liquids, gases, and semi-solid suspensions.

BACKGROUND OF THE INVENTION

A thermal anemometer is a device used to measure liquid and gas flow rates. Thermal convection of heat from an actuated sensor to the ambient environment is the primary transduction mechanism. That is, as heat is conducted away from the device, a thermo-resistive change takes place in the transducer which causes the electrical state of the device to change. This change in electrical state is measured either directly or indirectly through, for example, a Wheatstone bridge.

The thermo-resistive active area of the sensor is typically a hot wire or hot film of metal with a known temperature dependent resistance. The active area must be heated to some temperature above the ambient temperature, or else thermal convection does not occur. Current driven through the thermo-resistor serves to heat the active area according to Joule's First Law.

Thermal anemometers are normally operated in one of three modes: constant current, constant voltage, or constant temperature. In each case, the current, voltage, or temperature of the device is maintained as the flow rate changes. The change in device temperature, as already explained, causes a concomitant change in resistance. Constant current circuits are preferable when the amount of current needs to be precisely controlled to prevent adverse effects, such as overheating, which can lead to premature device failure.

Because the conductors are generally small and thermal conduction noise minimal, hot wire anemometers are often considered the preferred method for flow rate measurement. However, hot wire anemometers tend to be expensive to fabricate and fragile. For this reason, hot film anemometers are often preferred.

In hot film anemometry, the active layer is a thin metal film (such as platinum) or semiconductor (such as silicon) supported by a flat insulating layer. Many hot metal film anemometers are open bridge configurations where the active film is minimally supported by a thin membrane over a cavity. While the thin membrane (e.g., silicon dioxide) reduces the thermal conduction loss pathways, it also leads to device failure in extreme temperature and flow conditions due to uncontrolled stress and strain.

In prior art, U.S. Pat. No. 5,310,449, U.S. Pat. No. 5,231,877, and U.S. Pat. No. 4,930,347, all to Henderson, methods of fabrication for current driven semiconductor film microanemometers are described. The silicon active element responds dynamically to changes in ambient temperature due to its well known intrinsic semiconducting properties. Devices from the '449, '877, and '347 patents to Henderson, were susceptible to failure due to thin nitride support bridges which carried the metal contacts from the bulk to the sensor. Although these devices showed excellent sensitivity and response time, their tendency to fail prematurely in harsh environments limited their application.

U.S. Pat. No. 6,032,527 to Genova, the entire contents of which are incorporated herein by reference, distinguished itself from such earlier art by devising a novel sensor support scheme. The bonded wafer approach proposed in the '527 patent included a slight overlap between the sensing and support layers that maximized ruggedness without significantly affecting sensitivity. The amount of overlap and thus ruggedness were predetermined by the intended end application of the sensor. The device according to Genova also included through-wafer interconnects instead of wire bonds. Top surface wire bonds used in the prior art were routes for failure in high flow applications where the bonds could be sheared or acted to significantly impede the flow. Not only did the through-wafer electrical interconnects devised by Genova reduce the likelihood of interconnect failure, but they also facilitated back side contact to the packaging, protected the interconnects from the ambient flowstream, and allowed for simplified front side passivation before dicing.

The active element of the hot film anemometer presented in this invention is a thin mesa of silicon supported by both a silicon dioxide membrane and silicon substrate, similar to the device in the '527 patent. Recent advances, however, in microfabrication, dry film resists, spin-on glass, engineered glasses and packaging techniques have allowed for numerous improvements in the art.

SUMMARY OF THE INVENTION

The invention described herein is a micromachined anemometer having superior response, sensitivity and durability with improved packaging. The invention provides for more reliable ohmic contacts and their placement, a cavity for thermal isolation beneath the sensor layer, and an etched passivation layer. The microanemometer may also possess a cavity filled with a thermal insulator that provides support during fabrication. This microanemometer may be fabricated either on a silicon substrate or an engineered glass wafer. It also has through-wafer interconnects which can be implanted wires, sputtered or electroplated metal films, or conductive adhesives. A preferred embodiment is described, which integrates front side contacts with simple packaging. These and other features of the invention will be more readily appreciated in view of the following detailed description and drawings.

DETAILED DESCRIPTION OF THE INVENTION

Figure 1:
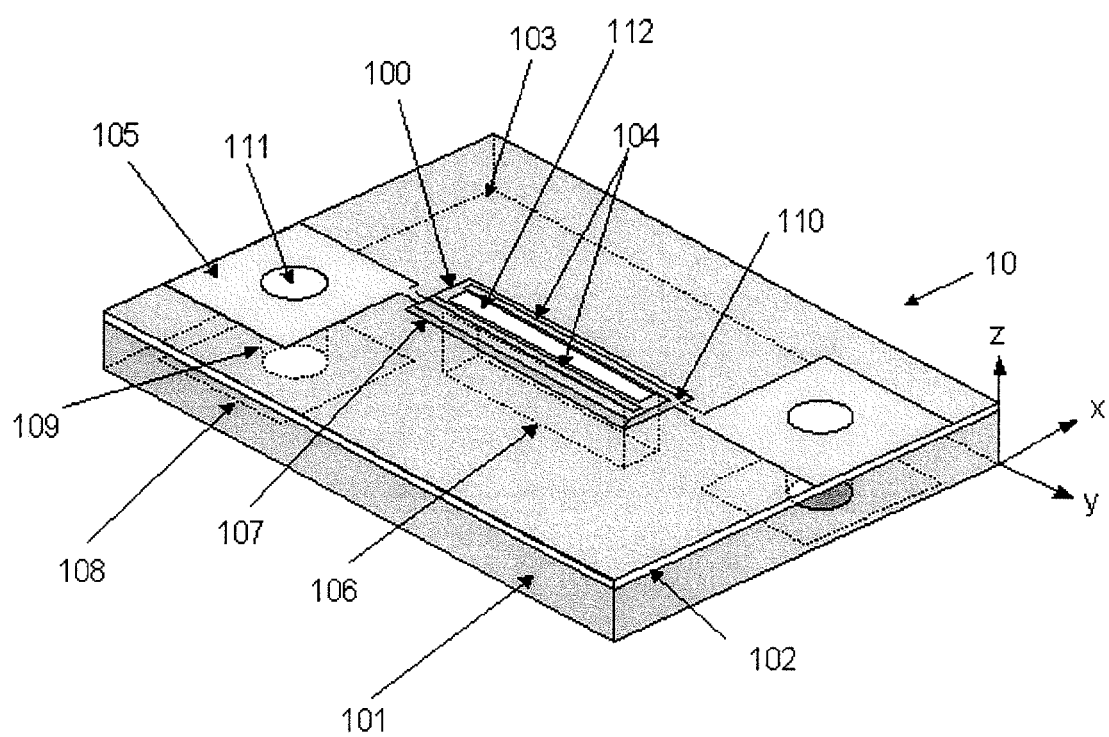
FIG. 1 shows a solid state anemometer, according to one embodiment of the invention.

A perspective drawing of a solid state microanemometer 10, according to one embodiment of the invention, is shown in FIG. 1. While microanemometer 10 is shown as a single part, it is fabricated in batch for greater efficiency. As such, microanemometer 10 is machined from a silicon wafer comprising sensor mesa 100 the lower surface of which is bonded to the upper surface of a second silicon wafer which serves as the base (or handle) wafer 101. Sensor 100 wafer is typically between 5 and 50 microns in thickness and base wafer 101 is typically in the range of 200 to 600 microns in thickness. Sensor 100 and base wafer 101 are separated by a thermal insulating film of buried silicon dioxide (BOX) 102 which can be from 0.1 to 5 microns thick. Sensor mesa 100 layer is formed from a lightly doped (e.g. phosphorous) silicon wafer to a level between $10^{12}$ and $10^{16}$ atoms/cm$^3$. Doping at this level provides increased sensitivity due to the exponential relationship between free carrier electron concentration and temperature. Doping may also be achieved with other shallow impurities such as boron over the same ranges as phosphorous, deep impurities such as gold to a range between $5 \times 10^{14}$ and $10^{16}$ atoms/cm$^3$, or a combination thereof.

A sequence of micromachining steps are performed on sensor 100 and base wafer 101 to achieve desired sensor mesa 100 and support structure topography. To produce ohmic contact between sensor 100 and metal conductors 104, sensor layer 100 is heavily doped (e.g. n+) with an impurity (e.g. phosphorous or boron) to a level of $10^{18}$ to $10^{21}$ atoms/cm$^3$. This doping occurs in sensor 100 layer silicon directly beneath metal contacts 104 to a depth which is in the range of 0.1 to 10 microns. The doped regions are defined by lithographic patterns and diffusion of impurities to sensor 100 silicon layer, and are accomplished by a standard open tube phosphorous doping process.

Sensor mesa 100 is then formed from an anisotropic wet etch, typically potassium hydroxide (KOH), of unmasked areas of sensor 100 silicon wafer; this etch produces sloped sidewalls 107 around the perimeter of the masked areas. The BOX 102 is resistant to the KOH and effectively halts the wet etch once the unmasked sensor silicon has been etched away. The back side of base wafer 101 should be protected with, for example silicon dioxide, during this etch.

Vias 111 are etched through BOX 102 using either a wet or dry technique, such as buffered hydrogen fluoride (HF) or reactive CH$_3$ ions, respectively. In either case, to properly pattern vias 111 for the etch, a thick photoresist (e.g. >10 microns thick) is required to coat the front side due to the topography produced by sensor 100. Vias 111 have diameters in the range of 75 to 250 microns. The selective oxide etch of the vias stops on the front side surface of base wafer 101. In the process, the protecting silicon dioxide on the back side of base wafer 101 is removed.

Next, a lift-off process is used to pattern the metal on the front side. Unlike prior techniques, metal bond pads 105 are positioned on opposite sides of sensor mesa 100. Again, a thick photoresist must be used to properly pattern sensor 100 front side topography. In the lift-off process either a negative resist with a re-entrant sidewall profile or a positive resist in combination with a lift-off enabler, such as for example Lift-Off Resists, LOR 5A, can be used to promote removal of metal after deposition. Metal conductors 104 and integral metal bond pads 105 are deposited using either a sputtering or rotating chuck evaporative process to ensure complete coverage of metal 110 along sloped sidewall 107 of sensor 100. A back-sputter may be run to remove unwanted oxide on the silicon surface of sensor 100 which would otherwise degrade the metal-silicon contact. The metal thickness ranges from 0.1 to 1.5 microns and may be a single metal such as Al, Au, Pt, Ni, Cu, Cr, W, Ti, or any combination thereof, including TiN, to produce a stable metal conductor 104 and integral bond pad 105. Unwanted metal and resist is removed using a heated bath of 1-methyl-2-pyrrolidinone (NMP) in a sonicator. Patterned metal conductors 104 and bond pads 105 are then annealed for a short time in a forming gas. Metal in bond pad 105 area also coats the base and sidewalls of vias 111.

Cavity 106 and through-wafer interconnect 109 are formed from a deep reactive ion etch (DRIE). Using the Bosch DRIE process, nearly vertical sidewalls with minimal sidewall scalloping can be produced. The DRIE is selective to silicon and proceeds from the back side of base wafer 101, which has been patterned and protected with a thick resist. The etch stops on BOX 102 inside cavity 106. The etch also stops inside through-wafer interconnect 109 on metal bond pad 105 at the base of via 111 leaving only a thin metal membrane.

The back side of base wafer 101 is passivated with a low pressure chemical vapor deposited (LPCVD) silicon dioxide. The silicon dioxide ranges from 1000 to 5000 Angstroms in thickness and electrically insulates the through-wafer interconnect 109, the back side of bond pad 105 and the back side of base wafer 101. A shadow mask is aligned to the back side of base wafer 101 and preferentially exposes areas for LPCVD silicon dioxide removal. Removing this silicon dioxide from the back side of bond pad 105 enables back-to-front electrical interconnection.

Next, a layer of metal is blanket sputtered on the back side of base wafer 101. The metal is preferably copper, since it easily adheres to dry film resists (commonly used for patterning layers with topography), but may also be Au or Ni. The thickness of the metal layer is in the range of 0.5 to 3 microns and sets the resistance of the back-to-front electrical interconnect. In a preferred embodiment, metal completely fills through-wafer interconnect 109 and is achieved by standard electroplating processes.

A layer of dry film resist is laminated and patterned onto the back side of base wafer 101. The dry film pattern tents over the openings of through-wafer interconnects 109 protecting the metal already sputtered therein. The dry film pattern also protects back side metal bumps 108. After dry film patterning, a metal etch removes all unprotected metal from the back side of base wafer 101. The front side sensor 100 is protected with an unpatterned dry film resist during this step. After etching, unwanted dry film resist is removed using N-Methylpyrrolidone ("NMP").

Finally, a passivation layer 103 is blanket deposited on the front side of the microanemometer 10 surface. The passivation layer 103 may be parylene, siliconoxynitride, diamond like carbon ("DLC"), or any other material with suitable electrical and thermal properties. The passivation layer ranges in thickness from 100 Angstroms to 10 microns. An optional dry film resist and etch step can be used to selectively open the passivation layer above sensor 100 to create an active area 112 inside which direct contact between sensor 100 and ambient environment is established.

Figure 2:
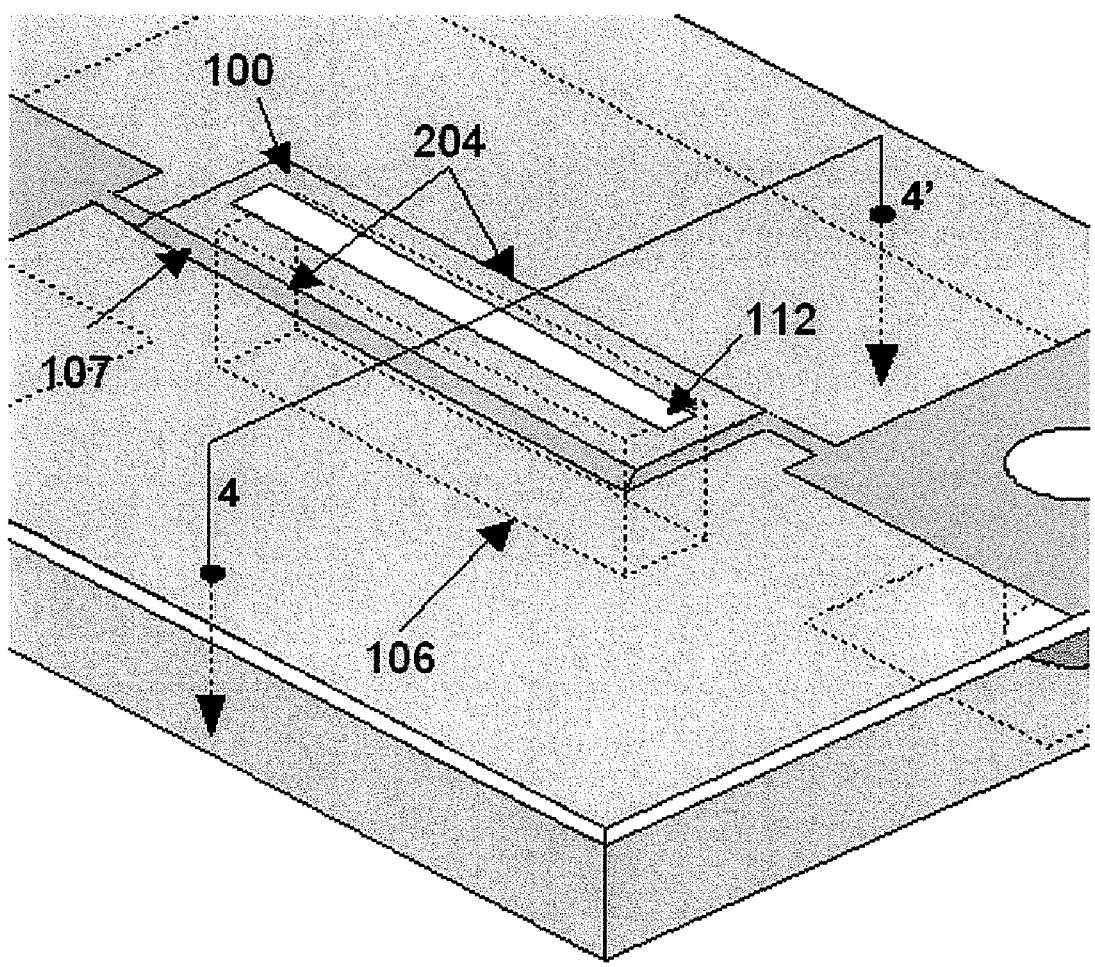
FIG. 2 is an alternate embodiment of the metal conductor 104 placement.

In an alternative embodiment, shown in FIG. 2, the metal conductors 204 contact sensor 100 on the sloped sidewalls 107 of the sensor mesa 100. There are two related advantages for contacting metal conductors 204 with the sensor mesa 100 in this fashion: electric field uniformity and sensor mesa 100 active area. In the conventional embodiment, in which metal conductors 104 make contact on the top of sensor 100, the electric field, in theory, arcs between conductors 104. Such electric field non-uniformity can result in uneven sensor 100 heating, especially for thick sensor 100 layers, which can cause unpredictable sensor response. Placing metal conductors 204 along the sides of the sensor 100 facilitates linear distribution of the electric field and thus provides a more uniform temperature profile inside sensor 100. As metal conductor 204 placement effectively increases the available active area 112 for sensor 100, the microanemometer 10 of the alternative embodiment can be miniaturized to achieve the same sensitivity as with a conventional device. In order to fabricate the device depicted by the alternative embodiment of FIG. 2, the previously described approach is followed except that the n+doping of sensor 100 occurs after the anisotropic wet etch of the sensor 100 silicon wafer. Both the deposition of the dopant and metal conductors 204 occur along the sidewall 107 of sensor 100.

Figures 3A, 3B:
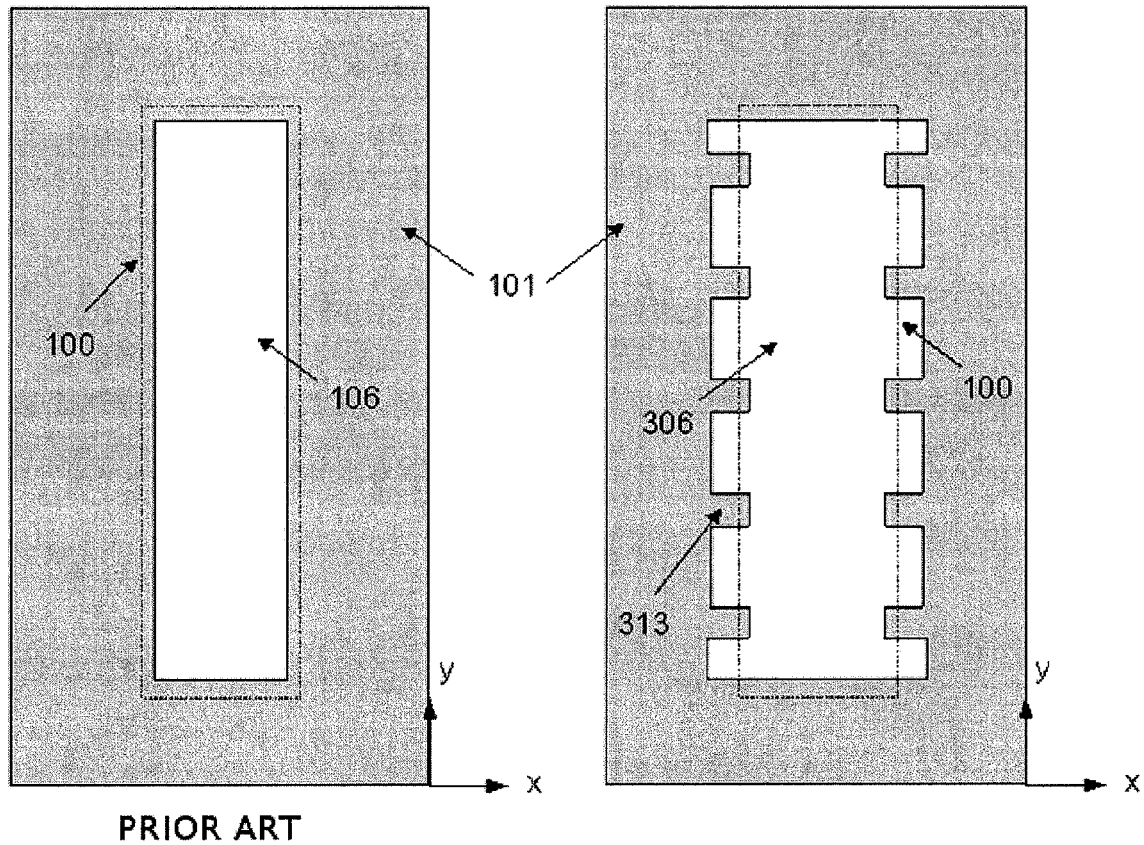
FIG. 3 depicts the conventional and an alternative embodiment of the sensor mesa 100 and cavity 306 overlap.

In FIG. 3A, a slice of the base wafer 101 through the x-y plane depicts the conventional cavity and an alternative embodiment is shown in FIG. 3B. As illustrated by FIG. 3A, overlap between sensor mesa 100 (dashed line) and cavity 106 acts as support for sensor 100. The amount of overlap varies depending on application and ranges from 1% to 30%. An unavoidable result of the overlap is to allow heat to conduct from the sensor 100 to the base layer 101 through the BOX 102. Such conduction causes some degree of thermal loading of sensor 100 and can compromise sensitivity and response time in demanding applications. Thus, one may minimize the overlap between sensor 100 and base wafer 101 or increase the thermal resistance between the two. The cavity scheme 306 shown in FIG. 3B is meant to decrease heat conduction from sensor 100 to base wafer 101 while maintaining a satisfactory level of structural integrity. The support ribs 313 provide ample foundation for sensor 100 while the absence of overlap between support ribs 313 minimizes thermal conduction paths. Another cavity scheme involves support ribs which traverse the cavity and, therefore, fully support the mesa over the cavity. These schemes are presented as examples and are, in no way, meant to limit the scope of such cavity designs using support ribs. BOX 102 eliminates any openings between sensor mesa 100 and base wafer 101. Support of sensor 100 in cavity scheme 306 can be further enhanced by thickening BOX 102 (e.g. 2 to 5 microns).

Figure 4:
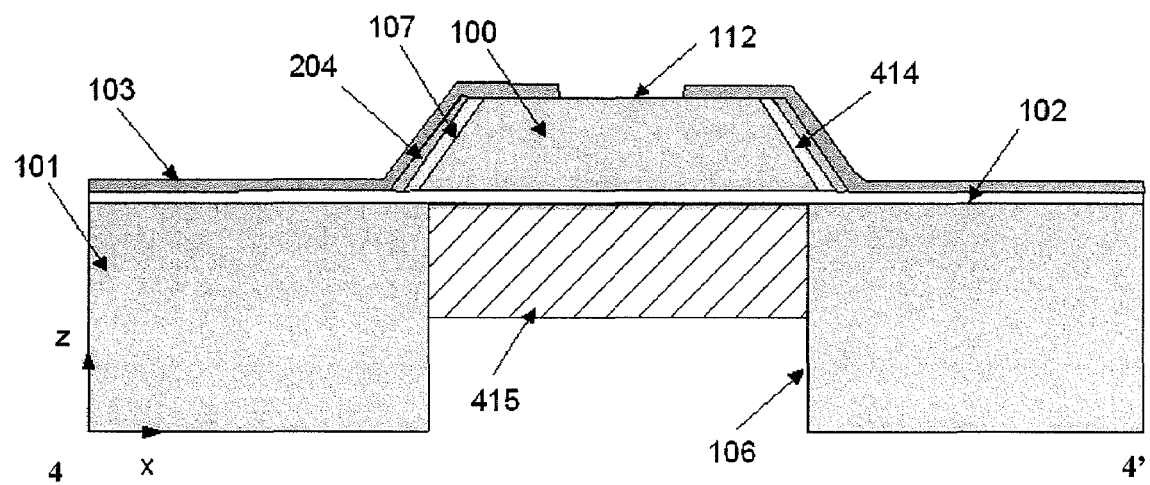
FIG. 4 is a cross sectional view of microanemometer 10 along line 4-4 of FIG. 2.

A cross-section view of microanemometer 10 along the line 4-4 in FIG. 2 is shown in FIG. 4. The n+ diffused regions 414 are shown as doped into the sensor 100 sidewall 107. A sacrificial layer 415 of spin-on glass or another thermally insulating material is shown partially filling the cavity. This sacrificial layer 415 is meant to support the sensor 100 during fabrication and is deposited immediately after the cavity etch. This sacrificial layer 415 does not completely fill the cavity and may be etched partially or completely away at the end of the process. Any sacrificial layer 415 material that remains after this process step strengthens microanemometer 10, without significantly altering sensitivity or response time.

An alternative embodiment of microanemometer 10 includes fabricating sensor 100 on an engineered glass base wafer 101 instead of silicon. The advantage of using a glass base wafer when compared to silicon is well understood in the art. Prior art describes the use of quartz, PYREX, or photosensitive glass for such purposes.

Referring again to FIG. 1, the silicon wafer for sensor 100 is bonded to an engineered glass base wafer 101 that has a similar coefficient of thermal expansion to silicon such as SD-2 glass from HOYA Corporation, USA. The engineered glass is ultrasonically milled, laser drilled, or etched with a micromachining process to form cavity 106 and through-wafer interconnect 109 before bonding. As a result of bonding sensor 100 to an engineered glass wafer, BOX 102 is no longer required nor is the LPCVD silicon dioxide used to passivate the through-wafer interconnect 109 surfaces. Furthermore, without BOX 102, vias 111 are not necessary. Metal deposited from the front side conformally coats through-wafer interconnect 109. Metal conductors contact sensor mesa 100 in either the embodiment 104 of FIG. 1 or the alternative embodiment 204 of FIG. 2. Metal conformally deposited and patterned from base wafer 101 back side connects metal bump 108 with front side metal bond pad 105 inside through-wafer interconnect 109 to complete the electrical path from base wafer 101 back side to sensor 100 conductor. Metal inside the through-wafer interconnect 109 may be thickened to desired resistance using standard electroplating techniques.

Figure 5:
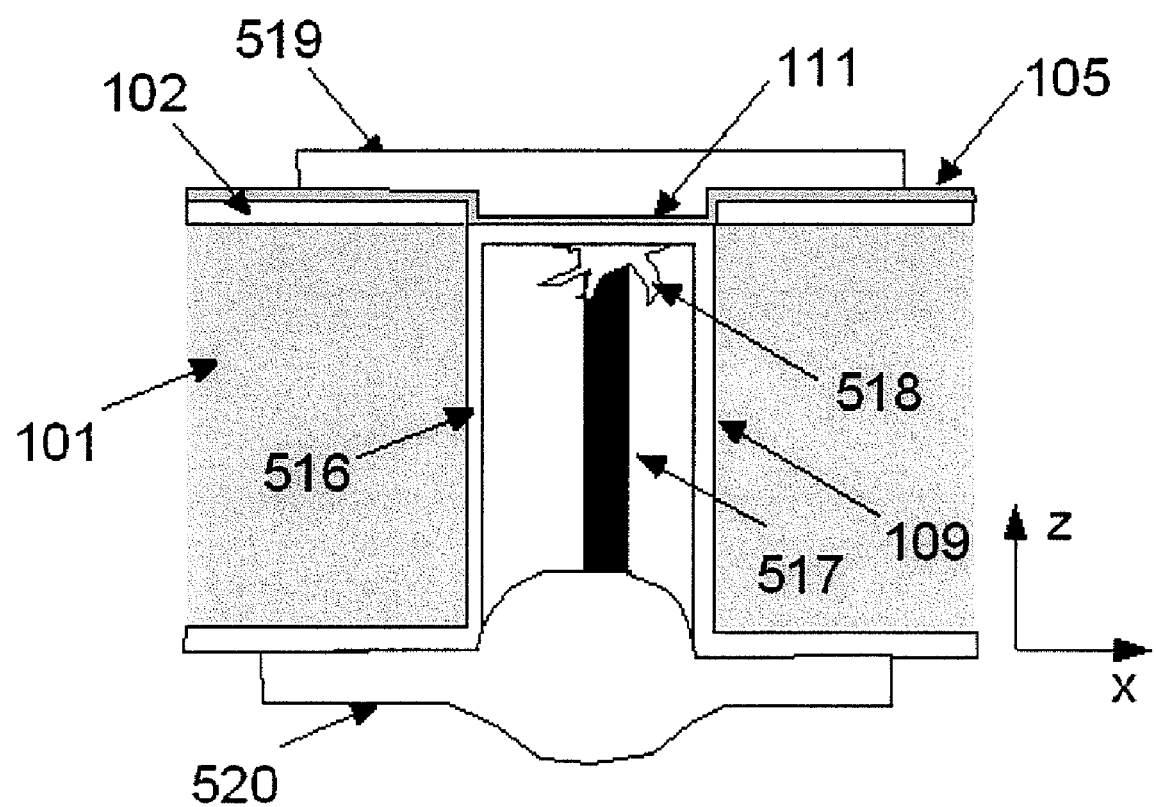
FIG. 5 is a cross sectional view of an implanted through-wafer interconnect, according to one embodiment of the invention.

In some cases, using either a silicon or engineered glass base wafer 101, it may be preferable to form the through-wafer electrical connections by implanting a wire instead of by sputtering and electroplating methods. FIG. 5 illustrates how such a wire can be implanted. In this case, fabrication of microanemometer 10 follows the conventional steps already described except that no back side metal is deposited. Through-wafer interconnects 109 of base wafer 101 are covered with the same LPCVD silicon dioxide 516 as before. Prior to, or after, dicing microanemometer 10 into separate parts, a conductive wire 517 of appropriate diameter, in the range of 50 to 200 microns, is fed through base wafer 101 either manually or automatically with or without a guide needle. The conductive wire perforates 518 both the bond pad metal 105 inside of via 111 and the LPCVD silicon dioxide 516 underneath it as the wire threads through-wafer interconnect 109. Conductive adhesive 519 such as silver epoxy affixes conductive wire 517 to the front side bond pad metal 105. The same conductive adhesive is used to secure the wire on the back side of base wafer 101 to create a back side bump contact 520. Passivation 103 is carried out after application of the conductive adhesive.

Yet another embodiment exists for forming through-wafer electrical interconnects. In this embodiment, both the metal bond pad 105 and (LPCVD) silicon dioxide 516 are mechanically or reactive ion etch ruptured to form perforation 518. Microanemometers 10 are then separated by dicing and secured to a package by pressing them into bumps of conductive adhesive dispensed onto the package. Due to the pressure applied to set the microanemometer onto the package, the conductive adhesive wicks up through-wafer interconnect 109 and out through perforation 518 to contact metal bond pad 105. Minor modifications within the scope of the invention can be made to accommodate the latter two approaches when base wafer 101 is an engineered glass. Such modifications will be evident to those skilled in the art.

Figure 6:
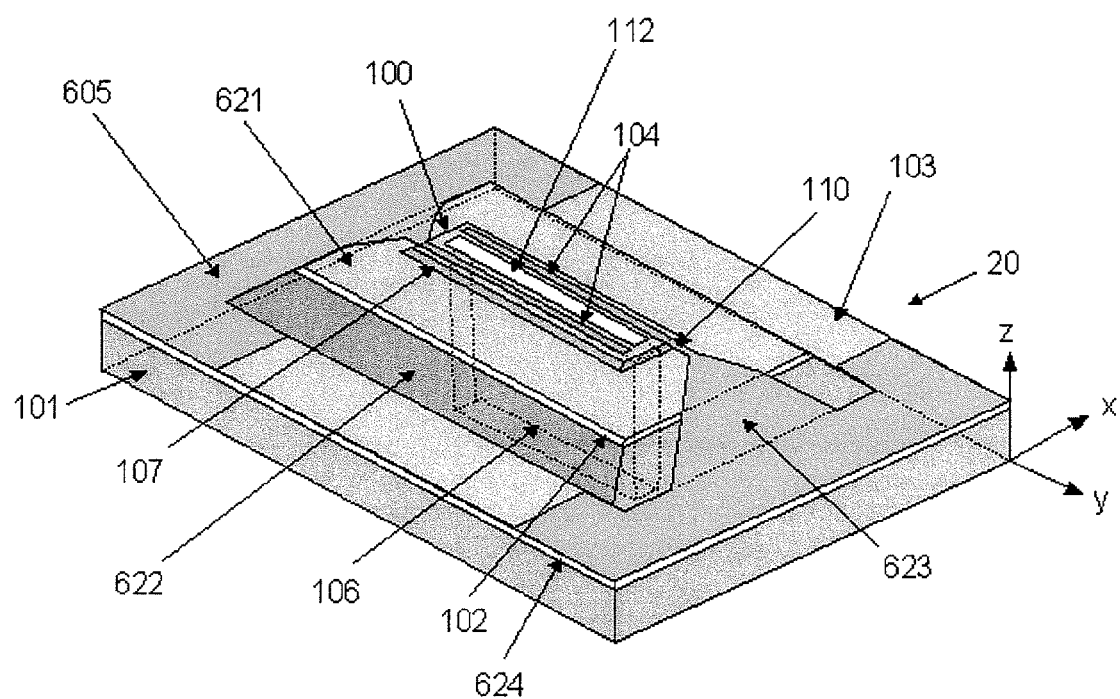
FIG. 6 is a microanemometer 20, according to one embodiment of the invention.

A preferred embodiment of microanemometer 20 is shown in FIG. 6. As in the conventional approach, sensor 100 is supported by base wafer 101 and is separated from base wafer 101 by BOX 102. Physical dimensions of the layers are similar to those already described. When assuming phosphorous doped silicon as the starting material for the sensor wafer, sensor 100 is doped as explained earlier with a high level of n+carriers directly beneath metal conductors 104. Sensor 100 is then formed from an anisotropic wet etch of unmasked areas of sensor 100 silicon wafer; this etch produces sloped sidewalls 107 around the perimeter of the masked areas. Cavity 106 is DRIE etched from the back side of base wafer 101.

Departing now from the conventional approach, base wafer 101 is anisotropically etched from the front side to create silicon mesa 621 in base wafer 101 with sloped sidewalls 622. The etch can be to a depth of 20% to 80% through base wafer 101 to create mesa sidewalls 622. An electrical insulating layer of silicon dioxide 624 is deposited (LPCVD) or grown (thermal oxidation) on the exposed silicon; this 1000 to 10,000 Angstrom thick oxide layer also covers the sloped sidewalls 622 of the base wafer 101. Front side metal contacts 605 and metal conductors 104 (or 204) are patterned using suitable lithographic processes which may include dry film resist, electrodeposition, or shadow masking; the preferred approach being dry film resist.

Deposited front side metal 623 may be Al, Au, Pt, Ni, Cu, Cr, W, Ti, or any combination thereof, including TiN. Front side metal 623 must span silicon mesa 621 sidewall 622 as well as sensor 100 sidewall 110 without a break in continuity. Front side metal contacts 605 are then used to connect directly to a package. Additionally, similar steps to the conventional approach may be followed to produce metal conductors 204 along the sides of sensor 100.

A passivation layer 103 is conformally deposited over the entire surface and selectively etched over metal contacts 605 and, optionally, over sensor active area 112 to allow direct interaction of sensor 100 with the ambient environment. Microanemometer 20 is secured to the package using a conductive adhesive, such as silver epoxy, or by a metal-to-metal thermo-compression bond. Packaging may occur before or after dicing microanemometer 20 into separate parts.

The sequence of process steps required to achieve microanemometer 20 of the preferred embodiment should be evident to those skilled in the art. Those skilled in the art will recognize alternative fabrication sequence steps may be employed to achieve the desired structure. Microanemometer 20 of FIG. 6 facilitates direct contact to packaging from the front side without need for wire bonds.

Figure 7:
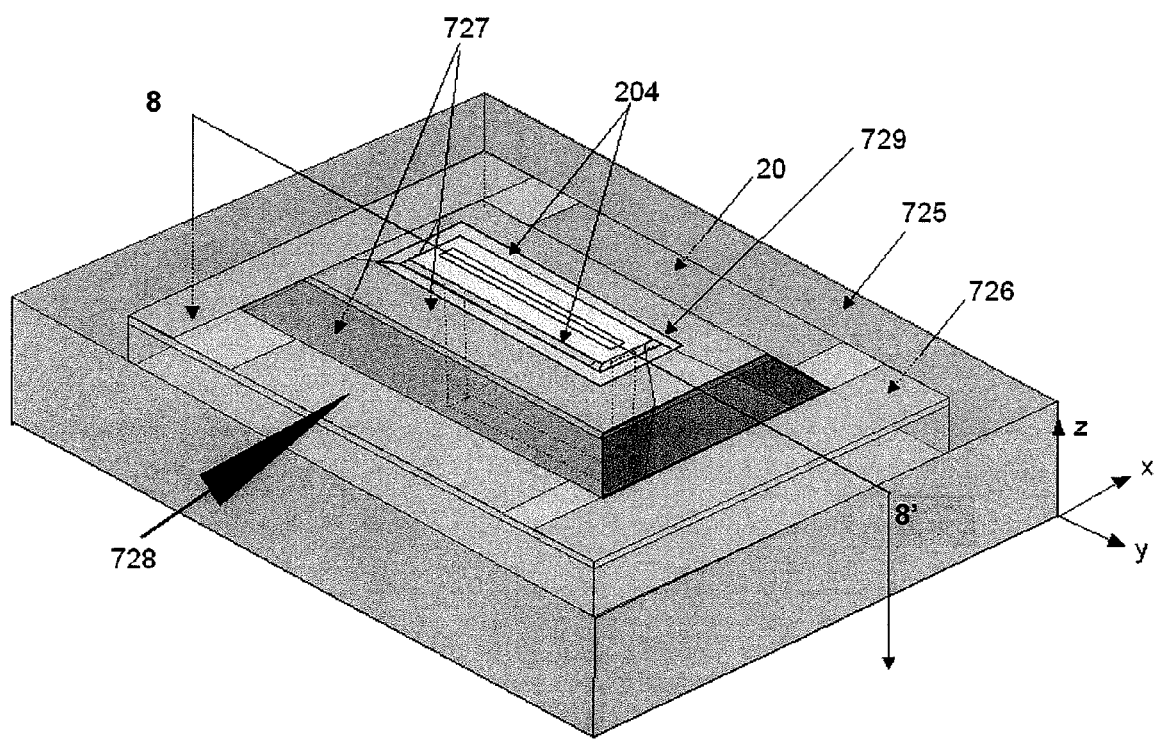
FIG. 7 is a perspective view of packaged microanemometer 20, according to one embodiment of the invention.
Figure 8:
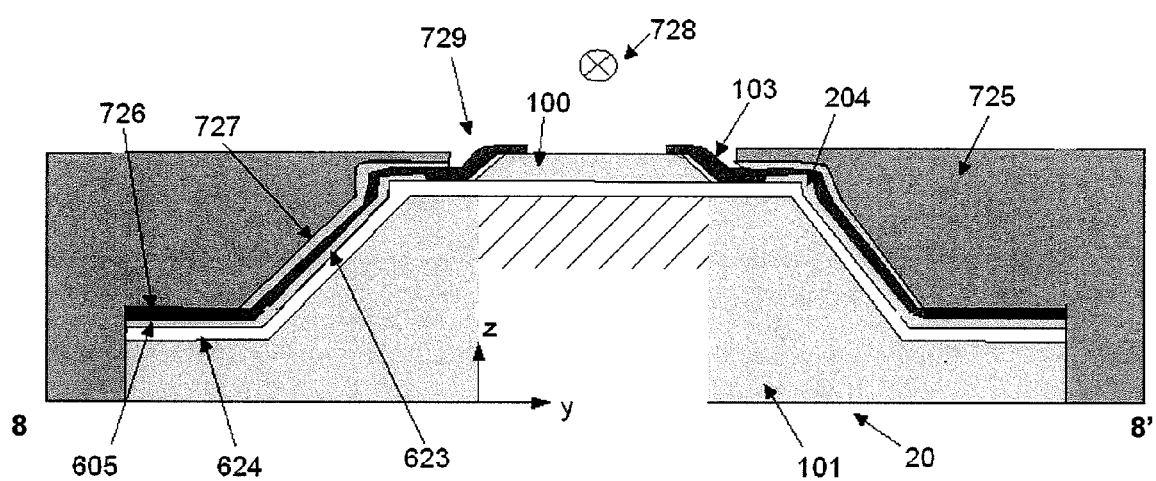
FIG. 8 is a cross section view of packaged microanemometer 20 along line 8-8 of FIG. 7.

FIG. 7 is a perspective view of microanemometer 20 encapsulated by package 725. FIG. 8 is a cross section view along line 8-8 in FIG. 7. Package 725 may be constructed from FR4, glass, or other machinable or moldable material having suitable thermal and electrical properties. Fabrication may utilize conventional photolithographic circuit board techniques. A flat surface of package 725 is metalized and patterned by a photolithographic or screen printing process to produce contacts 726 on each end of package 725. Package contacts 726 are oriented to connect with base wafer metal 605. Package 725 may be mass produced in sheets. Microanemometer 20 may be press fit into each package using conventional pick and place assembly. Package opening 729 permits the active area of microanemometer 20 to be fully exposed to the subject flow for measurement.

Package 725 encapsulates microanemometer 20 such that the sensor 100 layer is flush with or slightly elevated above the top of the package 725. Mounting in a flush or slightly elevated fashion minimizes turbulence in ambient fluid flow 728. Package 725 preferably seals with microanemometer 20 along front side metal 623 of base wafer mesa 621 using a silicone sealant 727 or other suitable adhesive compound. Dispensing of the sealant occurs before the press-fit operation conducted in the pick and place operation. Electrical connection between package 725 and micronanemometer 20 is made using a conductive adhesive such as silver epoxy applied between package metal contacts 726 and base wafer metal contacts 605. As with the adhesive sealant 727, the conductive adhesive is dispensed prior to the pick and place operation. In an alternative embodiment, the electrical connection between package metal contacts 726 and base wafer metal contacts 605 may be made using a thermo-compression metal-to-metal bond.

While some preferred embodiments of the invention and a suggested method for manufacture and integration of the package have been described, applicant does not wish to be limited thereby, and it is to be understood that various modifications could be made without departing from the scope and spirit of the invention. Accordingly, it is to be understood that changes may be made without departing from the scope of the invention as particularly set out and claimed. Those changes would be apparent to those skilled in the art.

The invention claimed is:

1. A microanemometer comprising:
   a) an electrically conductive resistor formed from a semiconductor wafer doped with an impurity, said resistor having
      1) a resistor upper surface;
      2) a resistor lower surface having a resistor peripheral edge;
      3) resistor sloped sidewalls;
      wherein the resistor sloped sidewalls are more heavily doped with an impurity than the resistor upper surface;
   b) a substrate bonded to the semiconductor wafer, said substrate having
      1) substrate upper surface;
      2) a substrate lower surface;
      3) a cavity having a cavity peripheral edge on the substrate upper surface, wherein a plurality of projections formed on the substrate upper surface extend inwardly over the cavity peripheral edge, and wherein the resistor lower surface is supported by at least part of the projections such that the resistor is suspended over the cavity; and
   c) a plurality of metal conductors in contact with the resistor sloped sidewalls.

2. The microanemometer according to claim 1, further comprising a passivation layer on the front-side of the microanemometer.

3. The microanemometer according to claim 2, wherein the passivation layer is etched to reduce thermal mass.

4. The microanemometer according to claim 3, wherein the etched area of the passivation layer includes an opening on the top surface of the sensor layer to open said surface to the ambient.

5. The microanemometer according to claim 1, wherein the microanemometer is encapsulated in a package constructed from Flame Resistant 4, glass, or other machinable or moldable material having suitable thermal and electrical properties.

6. The microanemometer according to claim 5, wherein the electrical connection between the package and microanemometer is made using a thermo-compression bond.

7. The microanemometer according to claim 1, wherein sidewalls of the substrate are sloped.

8. The microanemometer according to claim 1, wherein the resistor sloped sidewalls are doped with an impurity that enhances resistor-to-metal conductor contact.

9. The microanemometer according to claim 1, wherein the metal conductors contact the resistor along the entire length of the resistor sloped sidewalls.

10. The microanemometer according to claim 1, wherein the metal conductors terminate in the form of front side bond pads situated on opposite ends of the resistor.

11. The microanemometer according to claim 10, comprising an isolation layer having etched features in the form of vias situated below the front side bond pads.

12. The microanemometer according to claim 11, wherein the substrate has etched features in the form of through hole vias that are aligned with the isolation layer vias.

13. The microanemometer according to claim 12, wherein the through holes vias are insulated with an electrically non-conductive material.

14. The microanemometer according to claim 12, wherein the through holes vias are made conductive by implanting a conducting element therein.

15. The microanemometer according to claim 14, wherein the conductive element is a metal filament.

16. The microanemometer according to claim 15, wherein the conductive element is held in place at the front side bond pad and back side with a conductive paste.

17. The microanemometer according to claim 12, wherein the through hole vias are made conductive by filling the through hole vias with a conductive paste.

18. The microanemometer according to claim 1, wherein the substrate layer projections are in the form of a bilateral, linear array of support ribs that at least partially span a gap opened by the cavity underneath the resistor.

19. The microanemometer according to claim 18, wherein the bilateral, linear array of support ribs join each other by spanning the entire gap opened by the cavity underneath the resistor.

20. The microanemometer according to claim 1, comprising a thermal isolation material partially filling the cavity.

21. The microanemometer according to claim 1, wherein the device is formed from a pre-bonded silicon-on-insulator wafer.

* * * * *